(12) United States Patent
He et al.

(10) Patent No.: US 12,323,508 B2
(45) Date of Patent: Jun. 3, 2025

(54) ELECTRONIC TEST EQUIPMENT AND OPTIONAL FUNCTION CONFIGURING METHOD

(71) Applicant: RIGOL TECHNOLOGIES CO., LTD., Jiangsu (CN)

(72) Inventors: Xiaohua He, Jiangsu (CN); Yue Wang, Jiangsu (CN)

(73) Assignee: RIGOL TECHNOLOGIES CO., LTD., Jiangsu (CN)

(*) Notice: Subject to any disclaimer, the term of this patent is extended or adjusted under 35 U.S.C. 154(b) by 156 days.

(21) Appl. No.: 18/198,130

(22) Filed: May 16, 2023

(65) Prior Publication Data

US 2023/0291543 A1    Sep. 14, 2023

Related U.S. Application Data

(63) Continuation of application No. PCT/CN2022/075529, filed on Feb. 8, 2022.

(30) Foreign Application Priority Data

Feb. 20, 2021    (CN) .................... 202110191692.2

(51) Int. Cl.
*H04L 9/06*    (2006.01)
*G06F 21/10*    (2013.01)
(Continued)

(52) U.S. Cl.
CPC .......... *H04L 9/0618* (2013.01); *H04L 9/0822* (2013.01)

(58) Field of Classification Search
CPC .................... H04L 9/0618; H04L 9/0822
(Continued)

(56) References Cited

U.S. PATENT DOCUMENTS

2006/0149683 A1*    7/2006    Shimojima ......... G06F 21/1011
                                                                705/59
2011/0167499 A1*    7/2011    Strom .................... G06F 21/121
                                                                726/27
(Continued)

FOREIGN PATENT DOCUMENTS

CN    102117388 A    7/2011
CN    103916241 A    7/2014
(Continued)

OTHER PUBLICATIONS

Xiaopeng Qi; Design of module—based test system configuration management system; IEEE:2020; pp. 194-197.*

(Continued)

*Primary Examiner* — Monjur Rahim
(74) *Attorney, Agent, or Firm* — Birch, Stewart, Kolasch & Birch, LLP (57) ABSTRACT

The present application relates to an electronic test equipment and an optional function configuring method. A ciphertext decryption authentication unit performs a decryption authentication operation according to a function option key and a function option ciphertext, performs a corresponding operation on a function device corresponding to the function option ciphertext according to an authentication result signal, and outputs the authentication result signal to an operation control unit, such that the operation control unit operates, according to the authentication result signal, a target function corresponding to the function option ciphertext.

18 Claims, 3 Drawing Sheets

(51) Int. Cl.
*H04L 9/08* (2006.01)
*H04L 9/32* (2006.01)
*H04L 9/40* (2022.01)

(58) Field of Classification Search
USPC .......................................................... 713/168
See application file for complete search history.

(56) References Cited

U.S. PATENT DOCUMENTS

| | | | | |
|---|---|---|---|---|
| 2011/0296175 | A1* | 12/2011 | Shin | H04L 9/0825 |
| | | | | 380/278 |
| 2013/0326299 | A1* | 12/2013 | Oshima | G01R 31/3177 |
| | | | | 714/735 |
| 2019/0258778 | A1* | 8/2019 | Park | H04L 9/0819 |
| 2019/0260587 | A1* | 8/2019 | Xu | H04L 9/3226 |
| 2020/0288210 | A1* | 9/2020 | Yang | H04N 21/4405 |

FOREIGN PATENT DOCUMENTS

| | | |
|---|---|---|
| CN | 107437997 A | 12/2017 |
| CN | 108574569 A | 9/2018 |
| CN | 108964922 A | 12/2018 |
| CN | 110627011 A | 12/2019 |
| CN | 112865970 A | 5/2021 |
| JP | 2003-44689 A | 2/2003 |
| JP | 2006-139523 A | 6/2006 |
| JP | 2011-508997 A | 3/2011 |
| JP | 2013-250250 A | 12/2013 |
| JP | 2018-152077 A | 9/2018 |
| JP | 2020-24600 A | 2/2020 |
| KR | 10-2011-0133447 A | 12/2011 |
| WO | WO 2012/149717 A1 | 11/2012 |

OTHER PUBLICATIONS

Extended European Search Report for European Application No. 22755521.6, dated Jul. 9, 2024.
Japanese Office Action for Japanese Application No. 2023-547689, dated Feb. 29, 2024, with English translation.
Japanese Office Action for Japanese Application No. 2023-547689, dated Jun. 5, 2024, with English translation.
Korean Office Action for Korean Application No. 10-2023-7030568, dated Jun. 25, 2024, with English translation.

* cited by examiner

FIG.6

ELECTRONIC TEST EQUIPMENT AND OPTIONAL FUNCTION CONFIGURING METHOD

CROSS-REFERENCE TO RELATED APPLICATIONS

The present application is a Continuation Application of International Application No. PCT/CN2022/075529, filed on Feb. 8, 2022, which claims priority to Chinese Patent Application No. 202110191692.2 filed on Feb. 20, 2021, with the Patent Office of China National Intellectual Property Administration, each of which is incorporated herein by reference in its entirety.

TECHNICAL FIELD

The present application relates to the technical field of test and measurement, for example, to electronic test equipment and an optional function configuring method.

BACKGROUND

With the development of electronic technology, various electronic equipment has emerged. To meet the needs of developing, designing, and debugging electronic equipment, electronic test equipment is provided with more and more rich functions. For different needs of users, electronic test equipment of the same model can provide different optional functions, but users have to pay for the enablement of the optional functions.

In the traditional technology, a user pays a product seller for one optional function, the product seller provides the user with a ciphertext corresponding to the optional function, and the user can enable and use the optional function by inputting the ciphertext to the electronic test equipment. However, the security protection performance of the optional function of the electronic test equipment in the traditional technology needs to be improved.

SUMMARY

The present application provides electronic test equipment and an optional function configuring method capable of improving the security protection performance of the optional function.

In a first aspect, the present application provides an electronic test equipment, the equipment includes a ciphertext decryption authentication unit, an operation control unit, and a function device corresponding to an optional function, wherein the function device is coupled to the ciphertext decryption authentication unit, and the ciphertext decryption authentication unit is coupled to the operation control unit;

the ciphertext decryption authentication unit is configured to acquire a function option ciphertext and a function option key, perform a decryption authentication operation according to the function option key and the function option ciphertext, perform a corresponding operation on the function device corresponding to the function option ciphertext according to an authentication result signal, and output the authentication result signal to the operation control unit;

the function device is configured to process measurement data collected by the ciphertext decryption authentication unit and send target data obtained by processing the measurement data to the operation control unit;

the operation control unit is configured to operate a target function corresponding to the function option ciphertext according to the authentication result signal.

In a second aspect, the present application provides an optional function configuring method, the method including:

acquiring, by a ciphertext decryption authentication unit, a function option ciphertext and a function option key, performing a decryption authentication operation according to the function option key and the function option ciphertext, performing a corresponding operation on a function device corresponding to the function option ciphertext according to an authentication result signal, and outputting the authentication result signal to an operation control unit, wherein the function device is coupled to the ciphertext decryption authentication unit, and the ciphertext decryption authentication unit is coupled to the operation control unit;

processing, by the function device, measurement data collected by the ciphertext decryption authentication unit and sending target data obtained by processing the measurement data to the operation control unit; and operating, by the operation control unit, a target function corresponding to the function option ciphertext according to the authentication result signal.

DETAILED DESCRIPTION

The present application will be described in detail with reference to the accompanying drawings and embodiments. It should be noted that, the singular can cover the plural unless otherwise specified herein.

In the traditional technology, a user pays a product seller for one optional function, the product seller provides the user with a ciphertext corresponding to the optional function, and the user can enable and use the optional function by inputting the ciphertext to electronic test equipment. This ciphertext remains in the electronic test equipment. Every time the electronic test equipment starts up, the ciphertext is decrypted by an operation control unit of the electronic test equipment, and the corresponding optional function is enabled. Since the decryption is performed and the optional function is enabled by software, it is likely that a hacker cracks the ciphertext or changes the software execution order, so that the decryption process is skipped and the optional function is directly enabled by default, which leads to a great economic loss for the product seller. After an in-depth analysis, the inventors found that if it is the software running on the operation control unit that performs the decryption and enables the optional function, the optional function is easier to be cracked and tampered with by the hacker. In the traditional technology, a technical solution that combines a field programmable gate array (FPGA), the operation control unit, and a complex programmable logic device (CPLD) can also be employed, and after an in-depth analysis, the inventors found that the solution is not flexible enough. In view of this, a new mechanism is proposed, which realizes the decryption of a function option ciphertext and the enablement of a corresponding function device based on a ciphertext decryption authentication unit of the electronic test equipment, and thus avoids the operation control unit to decrypt the function option ciphertext. It should be noted that the function option ciphertext can be understood as a ciphertext corresponding to the optional function for enabling the function option selected by the user. The ciphertext decryption authentication unit may be any one of a logical operation unit (e.g., FPGA), a special-purpose microcontroller unit (MCU), and a CPLD. The operation control unit may be a central processing unit (CPU) or a digital signal process unit (DSP).

The present application provides electronic test equipment, including a ciphertext decryption authentication unit, an operation control unit, and a function device corresponding to an optional function, where the function device is coupled to the ciphertext decryption authentication unit, the ciphertext decryption authentication unit is coupled to the operation control unit, and the coupling between the ciphertext decryption authentication unit and the operation control unit may employ a relevant technology, for example, the coupling is via a bus, which is not limited in the present application. The ciphertext decryption authentication unit is configured to acquire a function option ciphertext and a function option key, perform a decryption authentication operation according to the function option key and the function option ciphertext, and send an authentication success signal to the operation control unit and enable a function device corresponding to the function option ciphertext if the authentication is successful. The function device corresponding to the function option ciphertext may be denoted as a target function device, and the target function device is configured to process measurement data collected by the ciphertext decryption authentication unit and send target data obtained by processing the measurement data to the operation control unit. The operation control unit is configured to enable a target function corresponding to the function option ciphertext according to the authentication success signal and perform a signal analysis on the target data through the target function. The electronic test device equipment may be a test platform in which one or more conventional devices, such as a digital oscilloscope, a signal source, a spectrum analyzer, and a digital multimeter, etc. are integrated.

Figure 1:
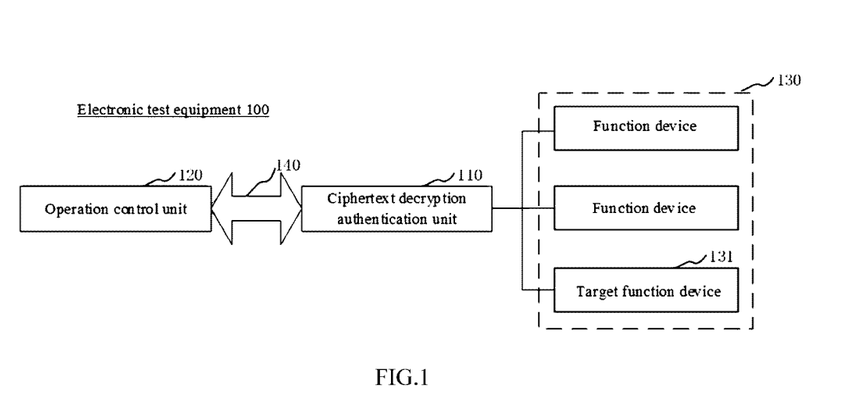
FIG. 1 is a block diagram of electronic test equipment according to an embodiment.

In an embodiment, as shown in FIG. 1, an electronic test equipment 100 is provided, and the electronic test equipment includes a ciphertext decryption authentication unit 110, an operation control unit 120, and function devices 130 corresponding to optional functions, wherein the function device 130 is coupled to the ciphertext decryption authentication unit 110, and the ciphertext decryption authentication unit 110 is coupled to the operation control unit 120 (for example, the ciphertext decryption authentication unit 110 may be coupled to the operation control unit 120 via a bus 140). The ciphertext decryption authentication unit 110 is configured to acquire a function option ciphertext and a function option key, perform a decryption authentication operation according to the function option key and the function option ciphertext, perform a corresponding operation on the function device corresponding to the function option ciphertext according to an authentication result signal, and output the authentication result signal to the operation control unit 120. The function device 130 is configured to process measurement data collected by the ciphertext decryption authentication unit 110, and send target data obtained by processing the measurement data to the operation control unit 120. The operation control unit 120 is configured to operate a target function corresponding to the function option ciphertext according to the authentication result signal.

In the electronic test equipment described above, the ciphertext decryption authentication unit performs the decryption authentication operation according to the function option key and the function option ciphertext, performs a corresponding operation on the function device according to the authentication result signal, and outputs the authentication result signal to the operation control unit, so that the operation control unit operates the target function corresponding to the function option ciphertext according to the authentication result signal. It can be seen that in the present application, not only is the decryption process instead taken over by the ciphertext decryption authentication unit, which improves the security protection performance of the optional function of the electronic test equipment, but also whether to enable the function device is determined based on the result of the decryption authentication operation, which provides an additional security mechanism for the optional function of the electronic test equipment, and greatly increases the difficulty of cracking the optional function of the electronic test equipment.

In an embodiment, with continued reference to FIG. 1, the electronic test equipment 100 is provided, including the ciphertext decryption authentication unit 110, the operation control unit 120, and the function device 130 corresponding to the optional function, wherein the function device 130 is coupled to the ciphertext decryption authentication unit 110, and the ciphertext decryption authentication unit 110 is coupled to the operation control unit 120. For example, the authentication result signal includes an authentication success signal, and the ciphertext decryption authentication unit 110 is configured to acquire the function option ciphertext and the function option key, perform the decryption authentication operation according to the function option key and the function option ciphertext, send an authentication success signal to the operation control unit 120 and enable the function device 131 corresponding to the function option ciphertext if the authentication is successful. The target function device 131 is configured to process the measurement data collected by the ciphertext decryption authentication unit 110 and send the target data obtained by processing to the operation control unit 120. The operation control unit 120 is configured to enable the target function corresponding to the function option ciphertext according to the authentication success signal and perform the signal analysis on the target data through the target function.

The ciphertext decryption authentication unit 110 may be a field programmable gate array (FPGA). The ciphertext decryption authentication unit 110 may perform data sampling and parallel calculations. The operation control unit 120 (e.g., Central Processing Unit, CPU), as an operation and control core of the electronic test equipment, may be a final execution unit in charge of signal processing, signal display, and control. At least one function device 130 is coupled to the ciphertext decryption authentication unit 110, and each function device has a distinct optional function. The function device may be any one or any combination of different types of filters, sampling modules, measurement modules, decoding modules, and triggering modules. It is to be noted that the ciphertext decryption authentication unit 110 and the function device 130 may be independent modules or integrated into one module, which is not limited in this embodiment. It is to be understood that the target function device 131 is one of the at least one function device 130, and in this embodiment, the function device corresponding to the optional function selected by the user is denoted as the target function device 131. When the user changes the optional function, the target function device 131 also changes accordingly.

For example, the function option ciphertext may be sent to the ciphertext decryption authentication unit 110 by the operation control unit 120 or an encryption server. The function option key may be stored in a storage space of the ciphertext decryption authentication unit 110, and then the ciphertext decryption authentication unit 110 acquires the function option key from the storage space thereof. The function option key may also be stored in a storage space of the operation control unit 120, and then the operation control unit 120 acquires the function option key from the storage space thereof and sends the function option key to the ciphertext decryption authentication unit 110. Thus, the ciphertext decryption authentication unit 110 acquires the function option ciphertext and the function option key. The ciphertext decryption authentication unit 110 performs the decryption authentication operation according to the function option key and the function option ciphertext. For example, the ciphertext decryption authentication unit 110 may encrypt the acquired function option key and a pre-stored function option plaintext to generate a ciphertext, and compare the acquired function option ciphertext with the generated ciphertext. If the acquired function option ciphertext is same with the generated ciphertext, it means that the authentication and decryption are successful, and if the acquired function option ciphertext is different from the generated ciphertext, it means that the authentication and decryption fail. If the authentication is successful, the ciphertext decryption authentication unit 110 sends an authentication success signal to the operation control unit 120, the authentication success signal may include the function identification information of the optional function, for example, the number or name of the optional function, etc., and the ciphertext decryption authentication unit 110 determines the function device 130 corresponding to the function option ciphertext as a target function device 131 among function devices corresponding to several optional functions and enables the target function device 131. The ciphertext decryption authentication unit 110 collects measurement data and sends the measurement data to the target function device 131, and the target function device 131 processes the collected measurement data to obtain target data. The target function device 131 sends the target data to the operation control unit 120. The operation control unit 120 enables a target function corresponding to the function option ciphertext according to the authentication success signal, and performs the signal analysis on the target data through the target function. The target function may include an amplitude measurement function, a time measurement function, a bandwidth limiting function, etc., but is not limited thereto. For example, after receiving the authentication success signal, the operation control unit 120 may enable the target function indicated by the function identification information of the optional function in the authentication success signal, and perform amplitude measurement analysis, time measurement analysis and/or bandwidth limiting analysis, etc., on the target data by the enabled target function.

For example, the target function device 131 can perform processing such as interpolation or compression on the measurement data according to time of the measurement data, the target function device 131 can also perform processing such as filtration on the measurement data according to a signal amplitude of the measurement data, and the target function device 131 can further perform processing such as alignment on the measurement data according to the signal amplitude and the time of the measurement data. The authentication success signal may be an interrupt signal, when the ciphertext decryption authentication unit 110 sends the interrupt signal to the operation control unit 120, the operation control unit 120 enables the target function and begins to receive the target data sent by the target function device, and the operation control unit 120 calls a program corresponding to the target function to perform signal processing on the target data, and displays an image corresponding to a signal processing result through a display screen.

The electronic test equipment described above, by the ciphertext decryption authentication unit, performs the decryption authentication operation according to the function option key and the function option ciphertext, sends the authentication success signal to the operation control unit and enables the function device corresponding to the function option ciphertext if the authentication is successful, so as to process the measurement data collected by the ciphertext decryption authentication unit and send the target data obtained by processing the measurement data to the operation control unit by the target function device, and thus, enables the target function corresponding to the function option ciphertext according to the authentication success signal and performs the signal analysis on the target data through the target function by the operation control unit. According to the present application, not only is the decryption process instead taken over by the ciphertext decryption authentication unit, which improves the security protection performance of the optional function of the electronic test equipment, but also whether to enable the function device is determined based on the result of the decryption authentication operation, which provides an additional security mechanism for the optional function of the electronic test equipment, and greatly increases the difficulty of cracking the optional function of the electronic test equipment.

For example, If the operation control unit receives a tampered decryption authentication operation result and the operation control unit enables the target function under the trigger of a tampered signal, but the ciphertext decryption authentication unit still disables the target function device according to an authentication failure signal, then the target function device is still in a disabled state, and the ciphertext decryption authentication unit cannot send the correct measurement data to the operation control unit. Even if the operation control unit enables the target function, a correct analysis result cannot be obtained because it is not the correct measurement data that is analyzed by calling the target function. It can be seen that this embodiment improves the security protection performance of the optional function of the electronic test equipment in terms of both decryption authentication and the condition for enabling the function device, and protects the intellectual property rights and other legal rights and interests of product sellers.

Figure 2:
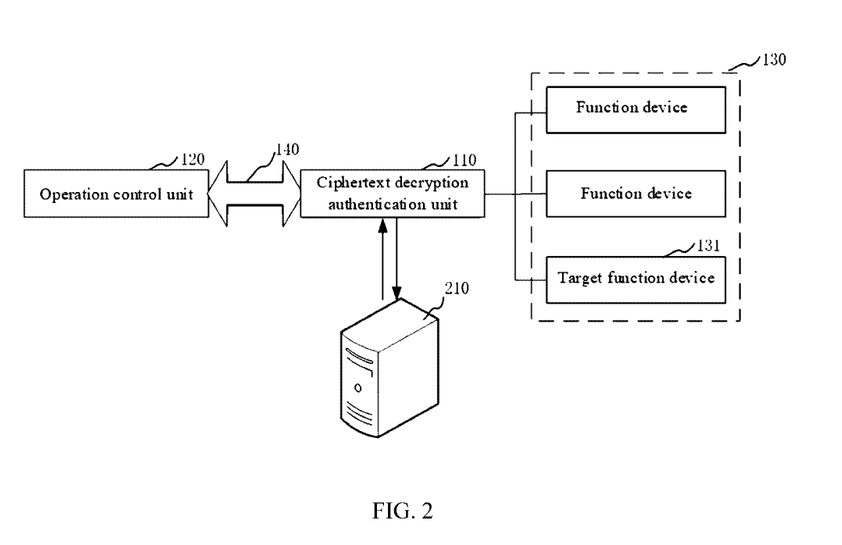
FIG. 2 is a block diagram of electronic test equipment according to another embodiment.

In an embodiment, as shown in FIG. 2, the ciphertext decryption authentication unit 110 is further configured to send a function option request to an encryption server 210 and obtain a function option ciphertext returned by the encryption server 210. The function option ciphertext is generated by the encryption server 210 performing encryption according to equipment identification information and function identification information carried in the function option request.

The function option request is a request triggered when a user selects an optional function. The electronic test equipment is provided with a button or a knob corresponding to the optional function, and the function option request may be triggered by pressing the button corresponding to the optional function or by turning the knob corresponding to the optional function. The ciphertext decryption authentication unit may communicate with the encryption server.

For example, the user triggers the function option request, the ciphertext decryption authentication unit 110 sends the function option request to the encryption server 210, and the encryption server 210 receives the function option request. The function option request carries the equipment identification information of the electronic test equipment and the function identification information of the optional function selected by the user. The encryption server 210 performs encryption according to the equipment identification information and the function identification information carried in the function option request to obtain the function option ciphertext. The encryption server 210 returns the function option ciphertext to the ciphertext decryption authentication unit 110. For example, the equipment identification information may be an equipment number of the electronic test equipment, and the function identification information may be a function number of the optional function, that is, the encryption server 210 generates a function option ciphertext according to the equipment number of the electronic test equipment and the function number of the optional function.

In this embodiment, the function option request is sent to the encryption server by the ciphertext decryption authentication unit, and the ciphertext decryption authentication unit receives the function option ciphertext returned by the encryption server, so as to avoid some potential security risks and improve the security protection performance for enabling the optional function.

In an embodiment, the ciphertext decryption authentication unit has an optical-to-electrical signal conversion interface or a wireless communication interface, and the ciphertext decryption authentication unit is further configured to send the function option request to the encryption server via the optical-to-electrical signal conversion interface or the wireless communication interface.

The optical-to-electrical signal conversion interface may be a small form-factor pluggable (SFP) interface. SFP supports SONET, Gigabit Ethernet, Fiber Channel, and some other communication standards. The electronic test equipment may have a wireless communication unit, such as a 5G communication unit or a WIFI module. The wireless communication interface may be an interface for communication between the electronic test equipment and the encryption server. For example, the ciphertext decryption authentication unit may establish a communication with the encryption server through the optical-to-electrical signal conversion interface or the wireless communication interface, so that the ciphertext decryption authentication unit sends the function option request to the encryption server.

Figure 3:
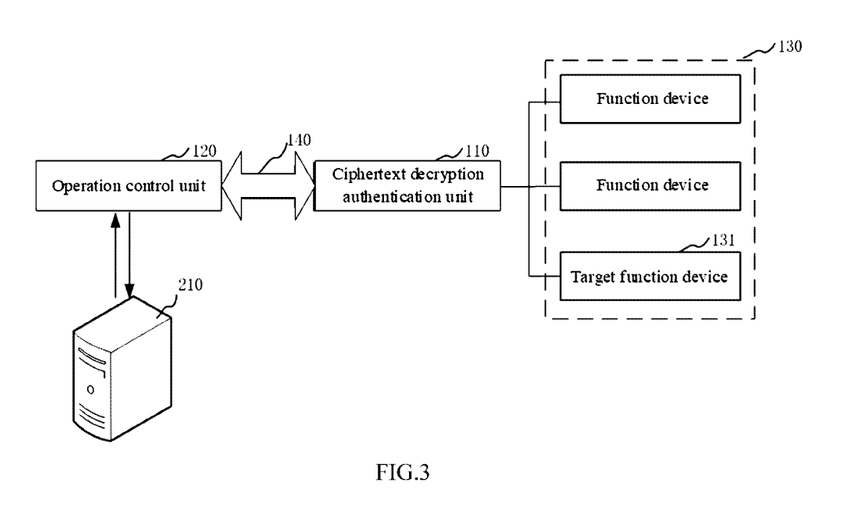
FIG. 3 is a block diagram of electronic test equipment according to yet another embodiment.

In an embodiment, as shown in FIG. 3, the operation control unit 120 is further configured to send the function option request to the encryption server 210, receive the function option ciphertext returned by the encryption server 210, and send the function option ciphertext to the ciphertext decryption authentication unit 110. The function option ciphertext is generated by the encryption server 210 performing encryption according to the equipment identification information and the function identification information carried in the function option request.

For example, the user triggers the function option request, the operation control unit 120 sends the function option request to the encryption server 210, and the encryption server 210 receives the function option request. The function option request carries the equipment identification information of the electronic test equipment and the function identification information of the optional function selected by the user. The encryption server 210 performs encryption according to the equipment identification information and the function identification information carried in the function option request to obtain the function option ciphertext. The encryption server 210 returns the function option ciphertext to the operation control unit 120. The operation control unit 120 sends the function option ciphertext to the ciphertext decryption authentication unit 110 via a bus. For example, the equipment identification information may be the equipment number of the electronic test equipment, and the function identification information may be the function number of the optional function, that is, the encryption server 210 generates a function option ciphertext according to the equipment number of the electronic test equipment and the function number of the optional function.

Figure 4:
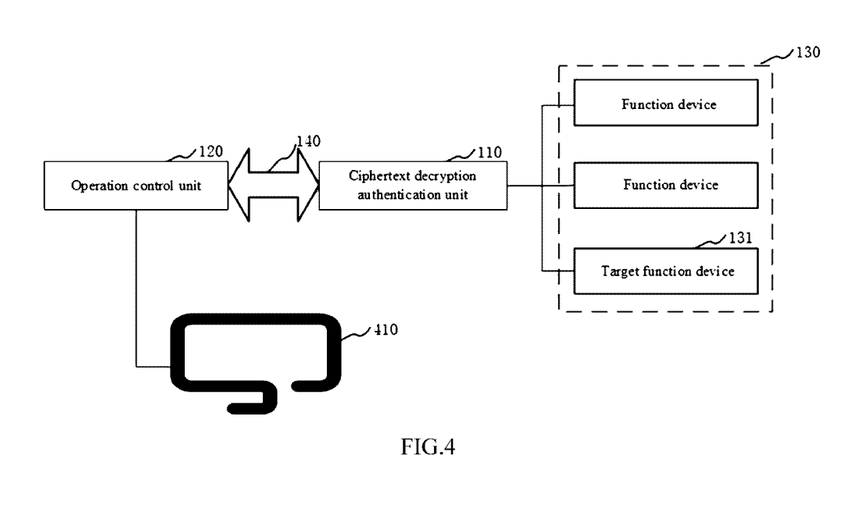
FIG. 4 is a block diagram of electronic test equipment according to still another embodiment.

In an embodiment, as shown in FIG. 4, the equipment further includes a display screen 410 coupled to the operation control unit 120. The display screen 410 is configured to receive a user's optional operation on the target function and trigger the ciphertext decryption authentication unit 110 or the operation control unit 120 to send a function option request to the encryption server 210.

For example, the display screen 410 may display an operation interface, and the user may touch the operation interface to configure the optional function of the electronic test equipment. The user's optional operation on the target function is received through the display screen 410, the operation control unit is triggered to send the function option request to the ciphertext decryption authentication unit, and the ciphertext decryption authentication unit 110 sends the function option request to the encryption server 210. In this embodiment, the ease of operation of configuring the optional function by the user is improved by providing the display screen.

In an embodiment, the authentication result signal includes an authentication failure signal, and the ciphertext decryption authentication unit 110 is further configured to send the authentication failure signal to the operation control unit 120 and disable the target function device if the authentication fails, where the authentication failure signal may include function identification information of the optional function. The operation control unit 120 is further configured to disable the target function according to the authentication failure signal. For example, the operation control unit 120 may disable the target function indicated by the function identification information in the authentication failure signal. Optionally, the electronic test equipment further includes a first prompt unit configured to prompt that the target function is disabled.

For example, the ciphertext decryption authentication unit 110 is configured to acquire the function option ciphertext and the function option key, and perform the decryption authentication operation according to the function option key and the function option ciphertext. If the authentication fails, the ciphertext decryption authentication unit 110 sends the authentication failure signal to the operation control unit 120 and disables the target function device, so that the target function device is impossible to perform the corresponding signal processing on the measurement data. The operation control unit 120 receives the authentication failure signal and disables the target function configured by the user. Meanwhile, the first prompt unit is configured to prompt that the target function is in a disabled state, so as to remind the user of the situation and avoid the negative impact caused by the user using wrong data.

In this embodiment, the ciphertext decryption authentication unit performs the decryption authentication operation, and returns the authentication result to the operation control unit. If the authentication fails, on the one hand, the ciphertext decryption authentication unit returns the authentication failure signal to the operation control unit, and the operation control unit disables the target function; on the other hand, the ciphertext decryption authentication unit disables the target function device, and a double-mechanism security protection for the enablement of the optional function is performed, which not only solves the problem that the optional function is easy to be cracked, but also make it possible to lock the optional function by disabling the target function device when the authentication result is tampered with, thereby avoiding the legal rights and interests of the product seller being harmed.

In an embodiment, the ciphertext decryption authentication unit 110 is further configured to send measurement data, namely, wrong data that is not processed by the function device to the operation control unit 120 in the case that the authentication fails. The operation control unit 120 is further configured to receive a tampered authentication success signal, enable a corresponding target function according to the tampered authentication success signal and perform a signal analysis on the wrong data through the target function.

The tampered authentication success signal may be an authentication success signal obtained by tampering with the authentication failure signal sent by the ciphertext decryption authentication unit 110. For example, the authentication failure signal may be tampered with into an authentication success signal, and the operation control unit 120 enables the corresponding target function according to the tampered authentication success signal. However, in the ciphertext decryption authentication unit 110, the authentication failure signal cannot be tampered with and remains as the authentication failure signal, then the corresponding function device is still in the disabled state, and the measurement data that is not processed by the corresponding function device can be considered as the wrong data, and in this case, the ciphertext decryption authentication unit 110 sends the wrong data to the operation control unit 120. The operation control unit 120 performs the signal analysis on the wrong data through the enabled target function. Optionally, the equipment further includes a second prompt unit configured to prompt that the current analysis result is not credible when the authentication failure signal is tampered with, so as to remind the user of the real situation and avoid the negative impact caused by the user using the wrong data.

In this embodiment, in a case where the operation control unit receives the tampered authentication success signal, even if the operation control unit enables the target function, the authentication failure signal cannot be tampered with and remains as the authentication failure signal in the ciphertext decryption authentication unit, and the corresponding function device is still in the disabled state, and thus the operation control unit cannot obtain correct measurement data, and a correct analysis result cannot be obtained even if the enabled target function is employed. Therefore, the optional function is disabled by disabling the target function device, thereby avoiding the legal rights and interests of the product seller being harmed.

In an embodiment, the function option key is stored in a storage space of the ciphertext decryption authentication unit or in a storage space of the operation control unit.

For example, the storage space of the operation control unit may be a non-volatile Flash, and the function option key is written into the non-volatile Flash. The operation control unit reads the function option key from the non-volatile Flash and sends the function option key to the ciphertext decryption authentication unit. Alternatively, the function option key is stored in the storage space of the ciphertext decryption authentication unit, and the ciphertext decryption authentication unit acquires the function option key from the storage space thereof.

In an embodiment, the present application provides an optional function configuring method, the method includes the following steps: a ciphertext decryption authentication unit acquires a function option ciphertext and a function option key, performs a decryption authentication operation according to the function option key and the function option ciphertext, performs a corresponding operation on a function device corresponding to the function option ciphertext according to an authentication result signal, and outputs the authentication result signal to the operation control unit, wherein the function device is coupled to the ciphertext decryption authentication unit, and the ciphertext decryption authentication unit is coupled to the operation control unit; the function device processes measurement data collected by the ciphertext decryption authentication unit and sends target data obtained by processing the measurement data to the operation control unit; and the operation control unit operates a target function corresponding to the function option ciphertext according to the authentication result signal. As such, the decryption process is instead taken over by the ciphertext decryption authentication unit, which improves the security protection performance of the optional function of the electronic test equipment.

In an embodiment, the present application provides an optional function configuring method, which can be applied to the electronic test equipment in any of the embodiments described above, as shown in FIG. 5, including the steps below.

Figure 5:
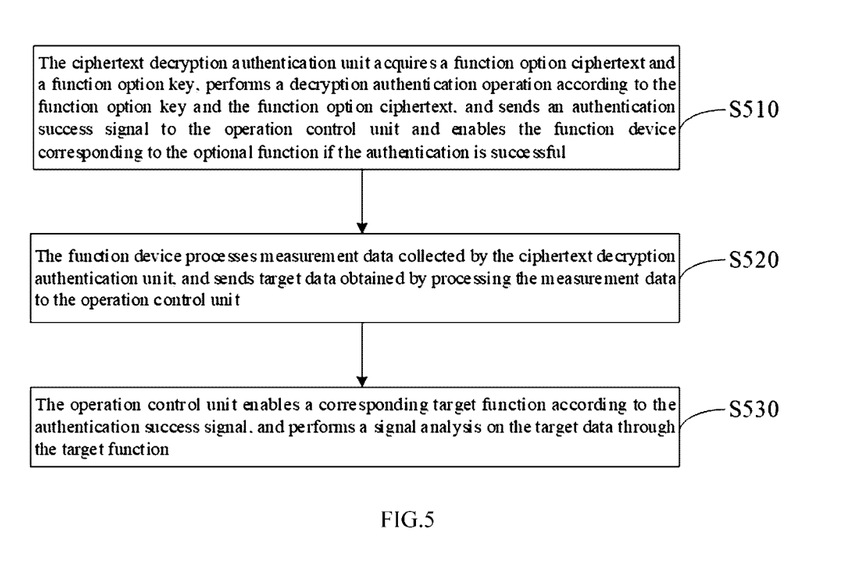
FIG. 5 is a flowchart of an optional function configuring method according to an embodiment.

In step S510, the ciphertext decryption authentication unit acquires a function option ciphertext and a function option key, performs a decryption authentication operation according to the function option key and the function option ciphertext, and if the authentication is successful, the ciphertext decryption authentication unit sends an authentication success signal to the operation control unit, and enables the function device corresponding to the optional function (i.e., the function device corresponding to the function option ciphertext).

The function device is coupled to the ciphertext decryption authentication unit, and the ciphertext decryption authentication unit is coupled to the operation control unit. For example, the ciphertext decryption authentication unit may be coupled to the operation control unit via a bus.

In step S520, the function device processes measurement data collected by the ciphertext decryption authentication unit, and sends target data obtained by processing the measurement data to the operation control unit.

In step S530, the operation control unit enables a corresponding target function according to the authentication success signal, and performs a signal analysis on the target data through the target function.

Figure 6:
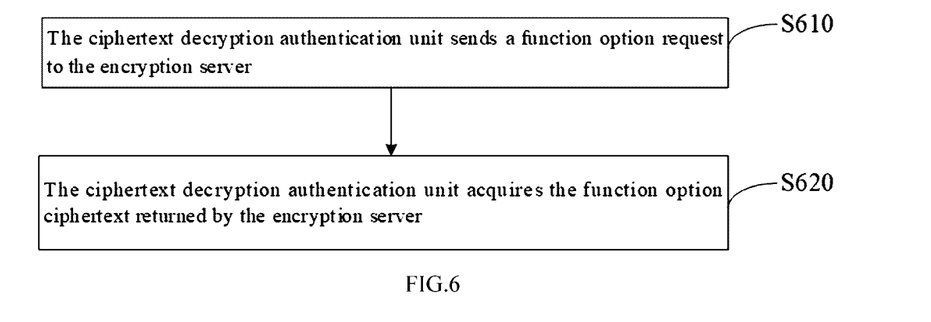
FIG. 6 is a flowchart of an optional function configuring method according to another embodiment.

In an embodiment, as shown in FIG. 6, before the ciphertext decryption authentication unit acquires the function option ciphertext, the method further includes:

In step S610, the ciphertext decryption authentication unit sends a function option request to the encryption server.

The function option request carries equipment identification information of the electronic test equipment and function identification information of the target function, and the function option request serves for instructing the encryption server to perform encryption according to the equipment identification information and the function identification information to generate the function option ciphertext.

Accordingly, the ciphertext decryption authentication unit acquires the function option ciphertext, including:

In step S620, the ciphertext decryption authentication unit acquires the function option ciphertext returned by the encryption server.

In an embodiment, the present application provides an optional function configuring method applied to the electronic test equipment described in the above embodiments, the method including the steps below.

In step S702, a response to a user's optional operation on the target function is generated through a display screen.

In step S704, the ciphertext decryption authentication unit sends the function option request to the encryption server and obtains the function option ciphertext returned by the encryption server.

The function option ciphertext is generated by the encryption server performing encryption according to the equipment identification information and the function identification information carried in the function option request.

In step S706, the ciphertext decryption authentication unit acquires the function option ciphertext and the function option key.

In step S708, the ciphertext decryption authentication unit performs the decryption authentication operation according to the function option key and the function option ciphertext.

If the authentication is successful, the method proceeds to steps S710 to S714. If the authentication fails, the method proceeds to steps S716 to S724.

In step S710, if the authentication is successful, the ciphertext decryption authentication unit sends the authentication success signal to the operation control unit and enables the function device corresponding to the function option ciphertext.

In step S712, the target function device processes the measurement data collected by the ciphertext decryption authentication unit and sends the target data obtained by processing the measurement data to the operation control unit.

In step S714, the operation control unit enables the target function corresponding to the function option ciphertext according to the authentication success signal and performs the signal analysis on the target data through the target function.

In step S716, if the authentication fails, the ciphertext decryption authentication unit sends an authentication failure signal to the operation control unit and disables the target function device.

In step S718, the operation control unit disables the target function according to the authentication failure signal.

In step S720, if the authentication fails, the ciphertext decryption authentication unit sends the wrong data that is not processed by the function device to the operation control unit, but the operation control unit receives a tampered authentication success signal.

Wherein, the tampered authentication success signal is an authentication success signal obtained by tampering with the authentication failure signal.

Step S720 is executed on the basis of step S716.

In step S722, the operation control unit enables the corresponding target function according to the tampered authentication success signal and performs a signal analysis on the wrong data through the target function.

In step S724, when the authentication failure signal is tampered with, prompt information indicating that the current analysis result is not credible is displayed on the display screen.

It should be understood that, although the various steps in the above-described flowcharts are shown sequentially as indicated by the arrows, the steps are not necessarily performed sequentially in the order indicated by the arrows. The steps are performed in no strict order unless explicitly stated herein, and the steps may be performed in other orders. Moreover, at least some of the steps in the above-described flowcharts may include a plurality of steps or stages, which are not necessarily performed at the same time, but instead may be performed at different times, and the order in which the steps or stages are performed may not be sequential, but instead may be performed in turn or in alternation with at least some of the other steps or steps or stages in the other steps.

The limitations of the optional function configuring method can be made reference to the limitations of the electronic test equipment described above, which will not be repeated again herein. Each unit of the electronic test equipment described above may be implemented in whole or in part by software, hardware, and combinations thereof. Each unit described above may be embedded in the form of hardware in a processor of a computer device or stored in the form of software in a memory of the computer device, so that they can be called by the processor to perform the operations corresponding to the above modules.

It will be appreciated by those skilled in the art that the structures shown in the above block diagrams are merely those of some of the structures relevant to the solution of the present application and do not limit the computer device to which the solution of the present application applies, and that the computer device may include more or less components than those shown in the drawings, or may combine certain components, or may have different arrangements of components.

It will be appreciated by those of ordinary skill in the art that all or part of the flows of the methods of the embodiments described above can be implemented by instructing relevant hardware by a computer program which can be stored in a non-volatile computer-readable storage medium and which, when executed, can include the flows of the embodiments of the methods described above. Here, any reference to a memory, storage, database, or other medium used in embodiments provided in the present application may include at least one of a non-volatile memory and a volatile memory. The non-volatile memory may include a read-only memory (ROM), a magnetic tape, a floppy disk, a flash memory, or an optical memory, etc. The volatile memory may include a random-access memory (RAM) or an external cache memory. By way of illustration and not limitation, the RAM can be in many forms such as Static Random Access Memory (SRAM) and Dynamic Random Access Memory (DRAM).

Technical features of the above embodiments can be combined in any manner, and for the brevity of the description, not all the possible combinations of these technical features in the above embodiments are set forth here. However, as long as there is no contradiction within the combinations of these technical features, all such combinations shall fall within the scope of the description.

What is claimed is:

1. An electronic test equipment, comprising a ciphertext decryption authentication unit, an operation control unit, and a function device corresponding to an optional function, wherein the function device is coupled to the ciphertext decryption authentication unit, and the ciphertext decryption authentication unit is coupled to the operation control unit, wherein
the ciphertext decryption authentication unit is configured to acquire a function option ciphertext and a function option key, perform a decryption authentication operation according to the function option key and the function option ciphertext, perform a corresponding operation on a function device corresponding to the function option ciphertext according to an authentication result signal, and output the authentication result signal to the operation control unit; and
the operation control unit is configured to operate a target function corresponding to the function option ciphertext according to the authentication result signal,
wherein the authentication result signal comprises an authentication success signal or an authentication failure signal, and
wherein in response to the authentication result signal comprising the authentication success signal, the ciphertext decryption authentication unit is further configured to send the authentication success signal to the operation control unit and enable the function device corresponding to the functional optional ciphertext, the enabled function device is configured to process measurement data collected by the ciphertext decryption authentication unit and send target data obtained by processing the measurement data to the operation control unit, and the operation control unit is further configured to enable the target function corresponding to the function option ciphertext according to the authentication success signal and perform a signal analysis on the target data via the target function.

2. The electronic test equipment according to claim 1, wherein the ciphertext decryption authentication unit is further configured to send a function option request to an encryption server and obtain the function option ciphertext returned by the encryption server;
the function option ciphertext is generated by the encryption server performing encryption according to equipment identification information and function identification information carried in the function option request.

3. The electronic test equipment according to claim 2, wherein the ciphertext decryption authentication unit has an optical-to-electrical signal conversion interface or a wireless communication interface;
the ciphertext decryption authentication unit is further configured to send the function option request to the encryption server via the optical-to-electrical signal conversion interface or the wireless communication interface.

4. The electronic test equipment according to claim 2, further comprising a display screen coupled to the operation control unit, wherein the display screen is configured to receive a user's optional operation on the target function, and trigger the ciphertext decryption authentication unit to send the function option request to the encryption server.

5. The electronic test equipment according to claim 1, wherein the operation control unit is further configured to send a function option request to the encryption server, receive the function option ciphertext returned by the encryption server, and send the function option ciphertext to the ciphertext decryption authentication unit;
the function option ciphertext is generated by the encryption server performing encryption according to equipment identification information and function identification information carried in the function option request.

6. The electronic test equipment according to claim 5, further comprising a display screen coupled to the operation control unit;
the display screen is configured to receive a user's optional operation on the target function and trigger the operation control unit to send the function option request to the encryption server.

7. The electronic test equipment according to claim 1, wherein in response to the authentication result signal comprising the authentication failure signal, the ciphertext decryption authentication unit is further configured to send the authentication failure signal to the operation control unit and disable a function device corresponding to the functional optional ciphertext,
the operation control unit is further configured to receive the authentication failure signal and disable the target function corresponding to the function option ciphertext according to the authentication failure signal.

8. The electronic test equipment according to claim 7, further comprising a first prompt unit configured to provide prompt information that the target function is disabled.

9. The electronic test equipment according to claim 1, wherein the ciphertext decryption authentication unit is further configured to send an authentication failure signal to the operation control unit, disable the function device corresponding to the function option ciphertext, and send measurement data that is collected by the ciphertext decryption authentication unit and is not processed by the function device to the operation control unit, wherein the authentication failure signal is comprised in the authentication result signal; and
the operation control unit is further configured to receive a tampered authentication success signal, enable the target function corresponding to the function option ciphertext according to the tampered authentication success signal, and perform a signal analysis on the measurement data through the target function, wherein the tampered authentication success signal is an authentication success signal obtained by tampering with the authentication failure signal.

10. The electronic test equipment according to claim 9, further comprising a second prompt unit configured to prompt that a signal analysis result output by the operation control unit is not credible in a case where the authentication failure signal is tampered with.

11. The electronic test equipment according to claim 1, wherein the function option key is stored in a storage space of the ciphertext decryption authentication unit or a storage space of the operation control unit.

12. The electronic test equipment according to claim 1, wherein the ciphertext decryption authentication unit is configured to encrypt the acquired function option key and a pre-stored function option plaintext to generate a ciphertext, compare the acquired function option ciphertext with the generated ciphertext to output the authentication result signal.

13. The electronic test equipment according to claim 1, wherein the electronic test equipment is a test platform integrated with a digital oscilloscope, a signal source, a spectrum analyzer, a digital multimeter, or the combination thereof.

14. An optional function configuring method, comprising:
acquiring, by a ciphertext decryption authentication unit, a function option ciphertext and a function option key, performing a decryption authentication operation according to the function option key and the function option ciphertext, performing a corresponding operation on a function device corresponding to the function option ciphertext according to an authentication result signal, and outputting the authentication result signal to an operation control unit, wherein the function device is coupled to the ciphertext decryption authentication unit, and the ciphertext decryption authentication unit is coupled to the operation control unit; and
operating, by the operation control unit, a target function corresponding to the function option ciphertext according to the authentication result signal,
wherein the authentication result signal comprises an authentication success signal or an authentication failure signal,
wherein in response to the authentication result signal comprising the authentication success signal, the outputting the authentication result signal to an operation control unit comprises:
sending, by the ciphertext decryption authentication unit, the authentication success signal to the operation control unit and enabling the function device corresponding to the function option ciphertext in response to an authentication success,
wherein the configuring method further comprises:
processing, by the enabled function device, measurement data collected by the ciphertext decryption authentication unit, and sending target data obtained by processing the measurement data to the operation control unit, and
wherein operating, by the operation control unit, a target function corresponding to the function option ciphertext according to the authentication result signal comprises:
enabling, by the operation control unit, the target function corresponding to the function option ciphertext according to the authentication success signal, and performing a signal analysis on the target data through the target function.

15. The configuring method according to claim 14, wherein the performing a decryption authentication operation according to the function option key and the function option ciphertext comprises:
encrypting the acquired function option key and a pre-stored function option plaintext to generate a ciphertext;
comparing the acquired function option ciphertext with the generated ciphertext to output the authentication result signal.

16. The configuring method according to claim 14, wherein in response to the authentication result signal comprising the authentication failure signal, the outputting the authentication result signal to an operation control unit comprises:
sending, by the ciphertext decryption authentication unit, the authentication failure signal to the operation control unit in response to an authentication failure, and disabling the function device corresponding to the function matching ciphertext, and
wherein operating, by the operation control unit, a target function corresponding to the function option ciphertext according to the authentication result signal comprises:
disabling, by the operation control unit, the target function corresponding to the function option ciphertext according to the authentication failure signal.

17. The configuring method according to claim 14, wherein in response to the authentication result signal comprising the authentication failure signal, the outputting the authentication result signal to an operation control unit comprises:
sending, by the ciphertext decryption authentication unit, the authentication failure signal to the operation control unit in response to an authentication failure, disabling the function device corresponding to the function option ciphertext, and sending measurement data that is collected by the ciphertext decryption authentication unit and is not processed by the function device to the operation control unit, and
wherein operating, by the operation control unit, a target function corresponding to the function option ciphertext according to the authentication result signal comprises:
receiving, by the operation control unit, a tampered authentication success signal, enabling the target function corresponding to the function option ciphertext according to the tampered authentication success signal, and performing a signal analysis on the measurement data through the target function, wherein the tampered authentication success signal is an authentication success signal obtained by tampering with the authentication failure signal.

18. The configuring method according to claim 14, before the ciphertext decryption authentication unit acquires the function option ciphertext, further comprising:
sending, by the ciphertext decryption authentication unit, a function option request to an encryption server, wherein the function option request carries equipment identification information of the electronic test equipment and function identification information of the target function, wherein the function option request serves for instructing the encryption server to perform encryption according to the equipment identification information and the function identification information to generate the function option ciphertext;
accordingly, acquiring, by the ciphertext decryption authentication unit, a function option ciphertext comprises:
acquiring, by the ciphertext decryption authentication unit, the function option ciphertext returned by the encryption server.

\* \* \* \* \*